United States Patent
Kang et al.

(10) Patent No.: US 10,150,466 B2
(45) Date of Patent: Dec. 11, 2018

(54) SHIFT CONTROL APPARATUS FOR HYBRID VEHICLE AND METHOD THEROF

(71) Applicant: Hyundai Motor Company, Seoul (KR)

(72) Inventors: Hyungsouk Kang, Seoul (KR); Hyung Bin Ihm, Seoul (KR); Tae Young Chung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 474 days.

(21) Appl. No.: 14/946,302

(22) Filed: Nov. 19, 2015

(65) Prior Publication Data

US 2017/0050634 A1  Feb. 23, 2017

(30) Foreign Application Priority Data

Aug. 19, 2015  (KR) .......................... 10-2015-0116946

(51) Int. Cl.
*B60W 20/30*  (2016.01)
*B60W 10/02*  (2006.01)
(Continued)

(52) U.S. Cl.
CPC ............ *B60W 20/30* (2013.01); *B60K 6/387* (2013.01); *B60K 6/442* (2013.01); *B60K 6/547* (2013.01);
(Continued)

(58) Field of Classification Search
CPC .......... B60W 20/30; B60W 30/18036; B60W 10/06; B60W 10/11; B60W 10/08; B60W 10/02; B60W 20/40; B60W 2710/1005; B60W 2710/083; B60W 2710/021; B60W 2510/244; B60W 2510/1015; B60W 2510/081; B60W 2520/10;
(Continued)

(56) References Cited

U.S. PATENT DOCUMENTS

| 2013/0150207 A1* | 6/2013 | Kobayashi | ............. B60K 6/442 477/5 |
| 2013/0244829 A1* | 9/2013 | Nefcy | ................... B60W 10/08 477/15 |

(Continued)

FOREIGN PATENT DOCUMENTS

| JP | H 06-284510 A | 10/1994 |
| JP | 2000-045813 A | 2/2000 |

(Continued)

*Primary Examiner* — David J Hlavka
(74) *Attorney, Agent, or Firm* — Brinks Gilson & Lione

(57) ABSTRACT

A shift control apparatus for a hybrid vehicle, capable of moving backward through control of a motor and a transmission. The shift control apparatus for the hybrid vehicle includes an engine as a power source; first and second motors connected to the engine; an engine clutch positioned between the engine and the first motor and selectively connecting the engine and the first motor; a transmission receiving a driving torque from at least one of the engine and first motor by a release or an engagement of the engine clutch; and a vehicle controller releasing the engine clutch if a backward moving request signal is input. The shift control apparatus further confirms a backward moving torque amount when the speed of the vehicle is a reference speed or less, and controls the first motor based on the backward moving torque amount for the vehicle to be moved backward.

15 Claims, 5 Drawing Sheets

(51) Int. Cl.
  *B60W 10/06* (2006.01)
  *B60W 10/08* (2006.01)
  *B60W 10/11* (2012.01)
  *B60W 20/40* (2016.01)
  *B60K 6/547* (2007.10)
  *B60K 6/387* (2007.10)
  *B60K 6/442* (2007.10)
  *B60W 30/18* (2012.01)

(52) U.S. Cl.
  CPC ............ *B60W 10/02* (2013.01); *B60W 10/06* (2013.01); *B60W 10/08* (2013.01); *B60W 10/11* (2013.01); *B60W 20/40* (2013.01); *B60W 30/18036* (2013.01); *B60W 2510/081* (2013.01); *B60W 2510/1015* (2013.01); *B60W 2510/244* (2013.01); *B60W 2520/10* (2013.01); *B60W 2540/16* (2013.01); *B60W 2710/021* (2013.01); *B60W 2710/083* (2013.01); *B60W 2710/1005* (2013.01); *B60Y 2200/92* (2013.01); *Y02T 10/6234* (2013.01); *Y02T 10/6286* (2013.01); *Y10S 903/914* (2013.01); *Y10S 903/919* (2013.01); *Y10S 903/93* (2013.01)

(58) Field of Classification Search
  CPC ... B60W 2540/16; B60W 20/20; B60K 6/442; B60K 6/387; B60K 6/547; Y02T 10/6286; Y02T 10/6234; Y10S 903/93; Y10S 903/919; Y10S 903/914; B60Y 2200/92; B60L 11/14
  See application file for complete search history.

(56) References Cited

U.S. PATENT DOCUMENTS

2016/0339908 A1* 11/2016 Komada ................ B60K 6/383
2017/0137020 A1*  5/2017 Kawanishi ............. B60L 11/14
2017/0361830 A1* 12/2017 Cho ..................... B60W 20/10

FOREIGN PATENT DOCUMENTS

| | | |
|---|---|---|
| JP | 2014083853 | 5/2014 |
| JP | 2015009726 | 1/2015 |
| KR | 1020100064719 | 6/2010 |
| KR | 1020120054322 | 5/2012 |

* cited by examiner

SHIFT CONTROL APPARATUS FOR HYBRID VEHICLE AND METHOD THEROF

CROSS-REFERENCE TO RELATED APPLICATIONS

This application claims the benefit of Korean Patent Application No. 10-2015-0116946 filed on Aug. 19, 2015, the contents of which are incorporated herein by reference in its entirety.

FIELD

The present disclosure relates to a shift control apparatus for a hybrid vehicle.

BACKGROUND

The statements in this section merely provide background information related to the present disclosure and may not constitute prior art.

A hybrid vehicle is a vehicle using two or more different kinds of power sources and is generally a vehicle that is driven by an engine that obtains a driving torque by burning fuel and a motor that obtains a driving torque with battery power.

Although the hybrid vehicle may be different from a fuel cell vehicle and an electric vehicle in a narrow sense, in the specification, the hybrid vehicle is defined as a general electric vehicle and a fuel cell vehicle.

The hybrid vehicle may be applied with a dual clutch transmission (DCT), a transmission mounted electric device (TMED) mounted with a transmission of a dual clutch type such as a direct shift gearbox (DSG), a flywheel mounted electric device (FMED).

Generally, as a device reversing a rotating direction for the backward movement, a direction reverse gear (Idler), a reverse gear (R-stage gear), bearings rotating various gears on a shift, a synchronizer ring required for a speed synchronization when engaging the reverse gear are existed.

A power input side gear is acted as an inertia when an input shaft is rotated, and the direction reverse gear, a power output side gear, and the synchronizer ring (hereinafter, referred to as a 'synchro-ring') are freely rotated even in a situation that the backward is not required. The free rotation of the gears and the synchro-ring acts as a drag force, thereby causing a power loss.

SUMMARY

One form of the present disclosure provides a shift control apparatus for a hybrid vehicle capable of moving backward through a control of a motor and a transmission without elements for a backward movement in a hybrid vehicle in which an automated manual transmission is mounted and a method thereof.

Also, the present disclosure provides a shift control apparatus for a hybrid vehicle performing the backward movement by controlling the motor after releasing an engine clutch and a method thereof.

A shift control apparatus for a hybrid vehicle according to one form of the present disclosure includes an engine as a power source; first and second motors connected to the engine; an engine clutch positioned between the engine and the first motor and selectively connecting the engine and the first motor; a transmission receiving a driving torque from at least one of the engine and first motor by a release or an engagement of the engine clutch; and a vehicle controller releasing the engine clutch if a backward moving request signal is input, confirming a backward moving torque amount when the speed of the vehicle is a reference speed or less, and controlling the first motor based on the backward moving torque amount for the vehicle to be moved backward.

The vehicle controller may include an engine clutch control unit releasing the engine clutch if the backward moving request signal is input; and a motor driver determining whether the speed of the vehicle is a reference speed or less and confirming the backward moving torque amount if the speed of the vehicle is the reference speed or less.

The motor driver may include a determining unit determining whether the speed of the vehicle is the reference speed or less; a braking executing unit setting the braking torque amount to brake the vehicle through the first and second motors if the speed of the vehicle exceeds the reference speed; and a backward moving executing unit confirming the backward moving torque amount for the backward moving of the vehicle if the speed of the vehicle is the reference speed or less.

The braking executing unit may include a braking gear stage selecting unit selecting a gear stage based on the gear stage before entering a "R" stage to brake the vehicle or a predetermined shift map; a transmission clutch control unit engaging the transmission clutch after synchronizing the motor speed based on the motor speed of the first motor and a main shaft speed of the transmission with the input shaft speed of the transmission, or engaging the transmission clutch with a predetermined speed; and a braking torque confirming unit confirming the braking torque amount depending on the situation information if the deceleration request of the driver is confirmed based on the situation information.

The backward moving executing unit may include a backward moving gear stage control unit confirming the gear stage engaged to the transmission and shifting downward the gear stage engaged to the transmission to a reference stage number when the confirmed gear stage is not the reference stage number; and a backward moving torque confirming unit confirming the backward moving torque amount through a forward driving torque map or a backward moving torque map if the backward moving acceleration request of the driver is confirmed based on the situation information.

Also, the shift control apparatus for the hybrid vehicle may further include a battery providing a driving voltage to the first and second motors, and the vehicle controller requests a starting to the engine when a SOC (State Of Charge) of the battery is a reference level or less, in a state that the engine is starting, a charge control unit charging the battery through the second motor is further included.

A shift control apparatus for a hybrid vehicle according to another form of the present disclosure includes an engine, a first and second motors as a power source; a battery providing a driving voltage to the first and second motors; a engine clutch positioned between the engine and the first motor and selectively connecting the engine and the first motor; a transmission receiving a driving torque from at least one of the engine and the first motor by a release or an engagement of the engine clutch; and a vehicle controller realizing a driving mode by controlling the release or the engagement of the engine clutch, wherein the vehicle controller includes an engine clutch release unit releasing the engine clutch if a backward moving request signal is input; a motor driver determining whether the speed of the vehicle is a reference speed or less and confirming a backward moving torque amount if the speed of the vehicle is the reference speed or less; and a charge control unit charging the battery by using the second motor when a SOC (State Of Charge) of the battery is the reference level or less.

A shift control method for a hybrid vehicle according to another form of the present disclosure includes releasing an engine clutch if a backward moving request signal is input; determining whether a speed of a vehicle is a reference speed or less; confirming a gear stage engaged to a transmission if the speed of the vehicle is the reference speed or less, whether the confirmed gear stage is a reference stage number, and whether there is a backward moving acceleration request of a driver based on a situation information if the gear stage engaged to the transmission is the reference stage number; confirming the backward moving torque amount depending on the situation information if there is the backward moving acceleration request of the driver; and controlling a motor based on the backward moving torque amount for backward moving the vehicle.

One form of the present disclosure may reduce the cost and the weight by removing the backward moving element, the efficiency of the transmission may be increased by the reduction of the friction resistance due to the backward moving element, and the fuel consumption may be improved.

Also, in one form of the present disclosure, since the gear shift from the forward driving stage gear to the backward driving gear backward is may not be necessary in the backward moving, the noise and the vibration due to the gear change may be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
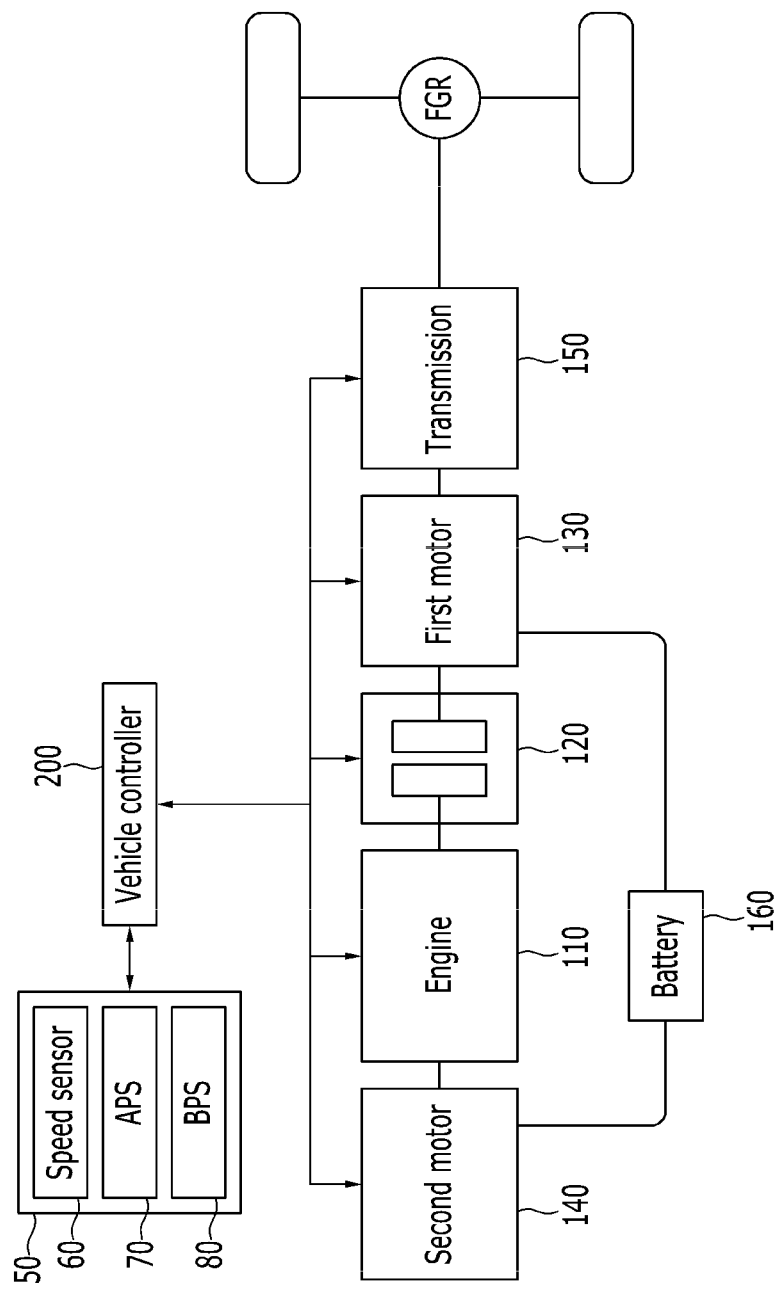
FIG. 1 is a view schematically showing a shift control apparatus for a hybrid vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view schematically showing a shift control apparatus for a hybrid vehicle according to one form of the present disclosure.

The shift control apparatus for the hybrid vehicle 100 includes an information detector 50, an engine 110, an engine clutch 120, a first motor 130, a second motor 140, a transmission 150, a battery 160, and a vehicle controller 200.

The information detector 50 detects a state of the vehicle to provide the state information to the vehicle controller 200. For this, the information detector 50 includes a vehicle speed sensor 60, an APS (Accelerator Position Sensor) 70, and a BPS (Brake Position Sensor) 80.

The vehicle speed sensor 60 senses the speed of the vehicle to provide the sensed signal to the vehicle controller 200.

The APS 70 measures how much a driver presses an accelerator pedal. That is, the APS 70 measures a position value of an accelerator pedal (a pushed degree of the accelerator pedal), and transmits a signal corresponding thereto to the vehicle controller 200. When the accelerator pedal is pushed completely, the position value of the accelerator pedal is 100%, and when the accelerator pedal is not pushed, the position value of the accelerator pedal is 0%.

Instead of the APS 70, a throttle valve opening detecting unit of a throttle valve mounted to an intake passage may be used. Accordingly, in the specification and the claims of the present disclosure, it is desired that the APS 70 includes the throttle valve opening detecting unit, and the position value of the accelerator pedal includes the opening of the throttle valve.

The BPS 80 measures how much the driver presses a brake pedal. That is, the BPS 70 measures a position value of the brake pedal (a pushed degree of the brake pedal), and transmits a signal corresponding thereto to the vehicle controller 200. When the brake pedal is pushed completely, the position value of the brake pedal is 100%, and when the brake pedal is not pushed, the position value of the accelerator pedal is 0%.

The engine 110 combusts fuel to generate power. That is, the engine 110 may use disclosed various engines such as a gasoline engine using conventional fossil fuel or a diesel engine. The rotation power generated from the engine 110 is transmitted to the transmission 150 side.

The engine clutch 120 is disposed between the engine 110 and the first motor 130, and is operated according to the control of the vehicle controller 200 to switch power delivery between the engine 110 and the first motor 130. That is, the engine clutch 120 connects or intercepts power between the engine 110 and the first motor 130 according to switching of an EV mode and an HEV mode.

The first motor 130 is operated by a three-phase AC voltage applied from the vehicle controller 200, thereby generating the torque. The first motor 130 is operated as a generator upon coast down running or regenerative braking to supply a voltage to the battery 160.

The second motor 140 may start the engine 110 or may be an integrated starter-generator that is operated as a generator in the state that the engine 110 is started to generate the electrical energy. That is, the second motor 140 may be a HSG (Hybrid Starter & Generator).

The transmission 150 adjusts a shift ratio according to the control of the vehicle controller 200, distributes an output torque that is added and applied through the engine clutch 120 according to a driving mode with a shift ratio, and transfers the output torque to the driving wheel, thereby enabling the vehicle to run.

In this case, the transmission 150 may be applied as a manual transmission 150 and may be a dual clutch transmission (DCT) 150.

The battery 160 is formed with a plurality of unit cells, and at the battery 35, a high voltage for providing a driving voltage to the first motor 130 and the second motor 140 is stored. The battery 160 supplies the driving voltage to the first motor 130 and the second motor 140 depending on the driving mode and is charged by the voltage generated from the first motor 130 and the second motor 140 in the regenerative braking.

When a commercial power source is plug-in connected, the battery 160 may be charged by a voltage and a current that are supplied through a charge device.

The vehicle controller 200 controls constituent elements of the hybrid vehicle including the information detector 50, the engine 110, the engine clutch 120, the first motor 130, the second motor 140, the transmission 150, the battery 160. That is, the vehicle controller 200 controls a hybrid driving mode setting and the entire operation of the hybrid vehicle.

The vehicle controller 200 collects and analyses the information for the information detector 50, the engine 110, the engine clutch 120, the first motor 130, the second motor 140, the transmission 150, the battery 160, and performs a cooperation control to control the output torque of the engine and first motor 130.

For this, the vehicle controller 200 may be implemented as one or more microprocessors operated by a predetermined program, and the predetermined program may include a series of commands for performing steps included in a shift control method of a hybrid vehicle according to one form of the present disclosure described hereinafter.

This vehicle controller 200 will be described in detail below with reference to FIG. 2.

Some processor of the shift control method of the hybrid vehicle according to one form of the present disclosure, will be described later, may be executed by a motor control unit (MCU) controlling the motor, some other processor may be executed by an engine control unit (ECU) controlling the engine 110, some other processor may be executed by a transmission control unit (TCU) controlling the transmission 150, and some other processor may be executed by a hybrid control unit (HCU) controlling the entire operation of the hybrid vehicle. That is, in the present disclosure, the vehicle controller 200 executes the shift control, however it is not limited thereto and the shift control may be executed in at least one among the MCU, the ECU, the TCU, the HCU if necessary.

Figure 2:
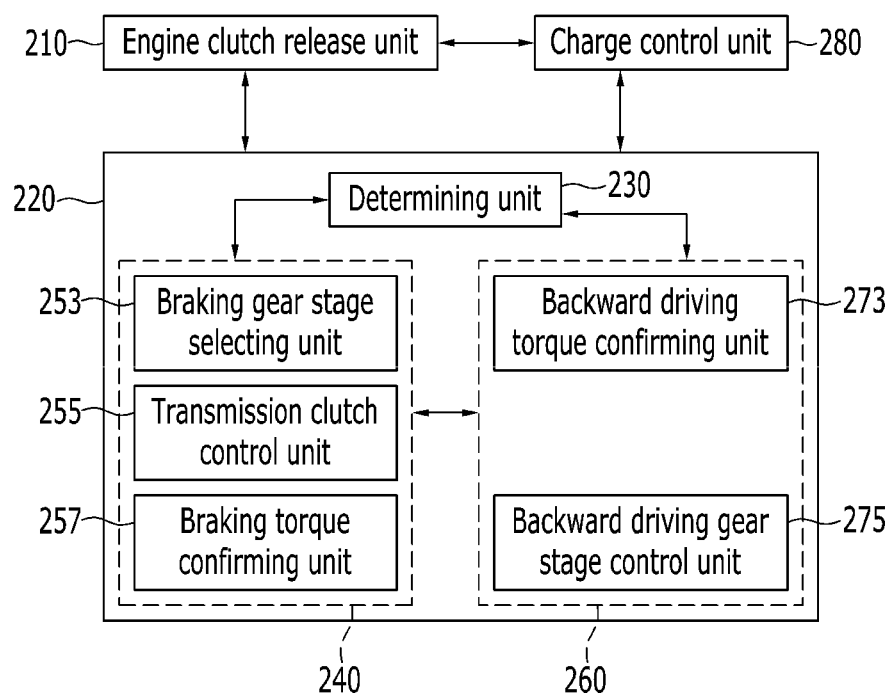
FIG. 2 is a view showing a vehicle controller of a shift control apparatus for a hybrid vehicle according to one form of the present disclosure.

FIG. 2 is a view showing a vehicle controller of a shift control apparatus for a hybrid vehicle according to one form of the present disclosure.

The vehicle controller 200 includes an engine clutch release unit 210, a motor driver 220, and a charge control unit 280.

If a backward moving request signal is input from the driver, the engine clutch release unit 210 releases the engine clutch 120 positioned between the engine 110 and the first motor 130.

The motor driver 220 controls a power delivery system for a braking of the vehicle or a driving of the backward moving and controls the first motor 130. For this, the motor driver 220 includes a determining unit 230, a braking executing unit 240, and a backward moving executing unit 260.

The determining unit 230 determines whether the speed of the vehicle is a reference speed or less. In this case, the reference speed may represent a speed to confirm whether the vehicle is stopped or moved. For example, the reference speed may be 0.

The braking executing unit 240 breaks the vehicle if the speed of the vehicle exceeds the reference speed. For this, the braking executing unit 240 includes a braking gear stage selecting unit 253, a transmission clutch control unit 255, and a braking torque confirming unit 257.

The braking gear stage selecting unit 253 selects a gear stage for the braking. That is, the braking gear stage selecting unit 253 selects the gear stage before engaging a shift state clutch. The braking gear stage selecting unit 253 selects the gear stage before entering the R stage to brake the vehicle. The braking gear stage selecting unit 253 may select the gear stage based on a predetermined shift map. In this case, the shift map may be a map predetermined based on a relation of the vehicle speed and the load.

Also, the braking gear stage selecting unit 253 may also select the gear stage based on a braking only shift map for a regeneration energy efficiency to be driven in a best driving point in the braking of the first motor 130.

The transmission clutch control unit 255 controls the transmission clutch to be engaged. That is, the transmission clutch control unit 255 synchronizes the motor speed with the input shaft speed of the transmission 150 based on the motor speed of the first motor 130 and the main shaft speed of the transmission 150 and then engages the transmission clutch.

The transmission clutch control unit 255 may engage the transmission clutch through a slip engagement control that the transmission clutch is slowly engaged in a predetermined speed.

The braking torque confirming unit 257 confirms a driver deceleration request and then confirms a braking torque amount depending on the driver deceleration request. In detail, the braking torque confirming unit 257 confirms the driver deceleration request based on the situation information. In this case, the situation information is information representing the situation of the vehicle and may represent information detected from the information detector 50. The situation information may include at least one of the following the speed of the vehicle, the accelerator pedal position value, and the brake pedal position value.

If the driver deceleration request is confirmed, the braking torque confirming unit 257 confirms the braking torque amount depending on the situation information in the predetermined braking torque map.

If the speed of the vehicle is the reference speed or less, the backward moving executing unit 260 controls the vehicle to be moved backward. For this, the backward moving executing unit 260 includes a backward moving gear stage control unit 273 and a backward moving torque confirming unit 275.

The backward moving gear stage control unit 273 controls the gear stage for the backward moving. In other words, the backward moving gear stage control unit 273 confirms the gear stage engaged to the transmission 150, when the confirmed gear stage is not a reference stage number, the backward moving gear stage control unit 273 shifts the gear stage engaged to the transmission 150 toward the reference stage number. In this case, the reference stage number may represent the gear stage to be engaged for the backward moving. For example, the reference stage number may be a "1" stage.

The backward moving torque confirming unit 275 confirms the backward moving torque amount and controls the first motor 130 based on the backward moving torque amount to move backward the vehicle. That is, the backward moving torque confirming unit 275 confirms the backward moving acceleration request of the driver based on the situation information, if the driver wants the backward moving acceleration, the backward moving torque confirming unit 275 confirms the backward moving torque amount through a forward moving torque map or the backward moving torque map. In this case, the forward torque map may represent the torque amount of the first motor 130 desired depending on the speed on the forward moving, and the backward moving torque map may represent the torque amount of the first motor 130 desired depending on the speed on the backward moving.

The charge control unit 280 controls the battery 160 to be charged. In other words, the charge control unit 280 confirms a SOC (State Of Charge) of the battery 160 and determines whether the SOC is a reference level or less. In this case, the reference level represents a reference level to charge the battery 160 and may be set to differentiate depending on the capacity of the battery 160.

If the SOC of the battery 160 is the reference level or less, the charge control unit 280 requests the starting to the engine 110 and controls the second motor 140 in the state the engine 110 is starting to charge the battery 160.

Next, the shift control method for the hybrid vehicle according to one form of the present disclosure will be described with reference to FIG. 3 to FIG. 5. Constituent elements of the vehicle controller 200 according to one form of the present disclosure that is described with reference to FIG. 1 and FIG. 2 may be integrated or subdivided, and constituent elements of the vehicle controller 200 that perform the above-described function regardless of a corresponding name may be constituent elements of the vehicle controller 200 according to one form of the present disclosure. Hereinafter, when describing a shift control method of the hybrid vehicle according to one form of the present disclosure, in each step, the vehicle controller 200 instead of the constituent elements of the vehicle controller 200 will be described as a subject.

Figure 3:
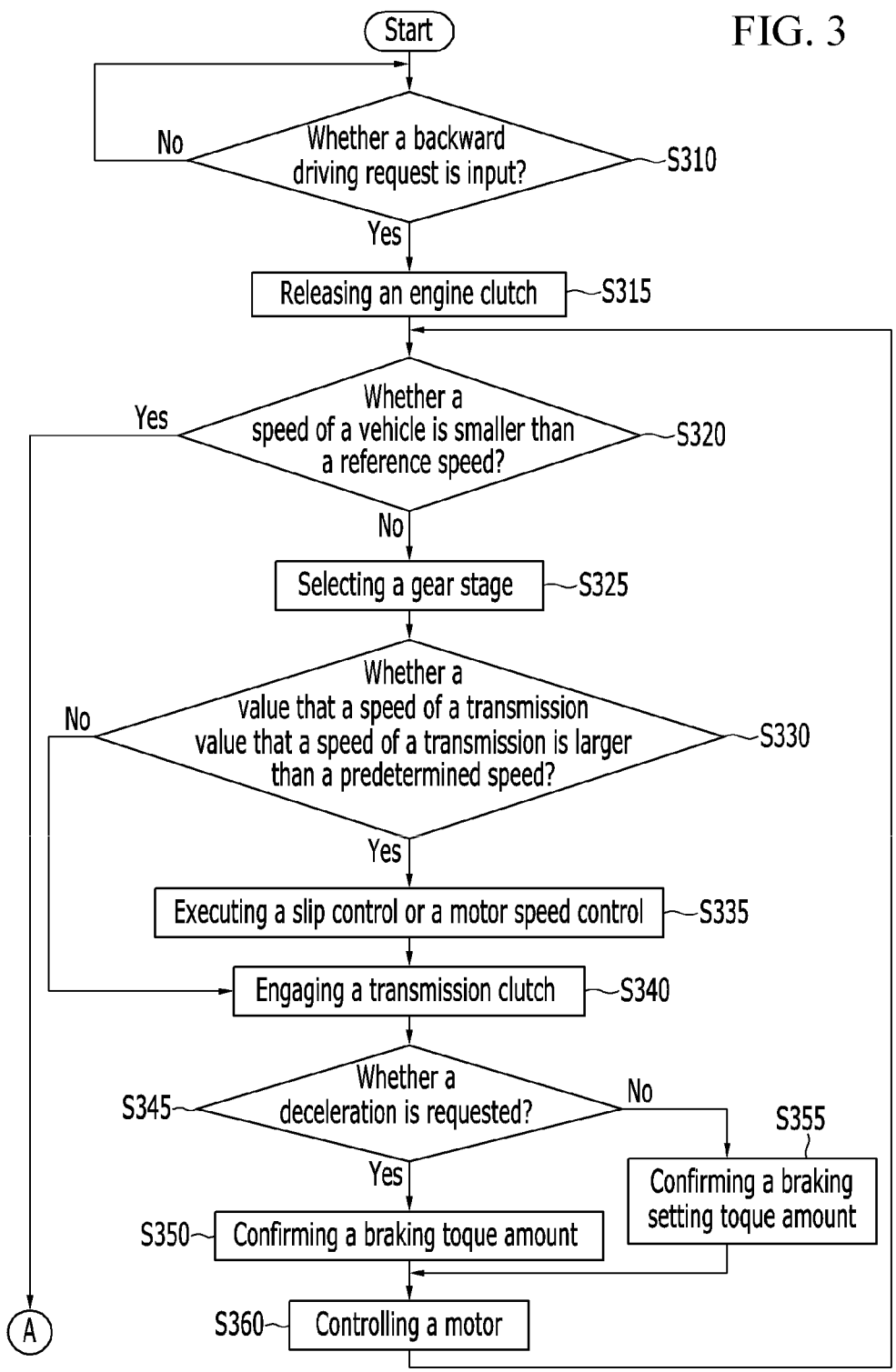
FIG. 3 and FIG. 4 are flowcharts showing a method controlling a shift in a hybrid vehicle according to one form of the present disclosure.
Figure 4:
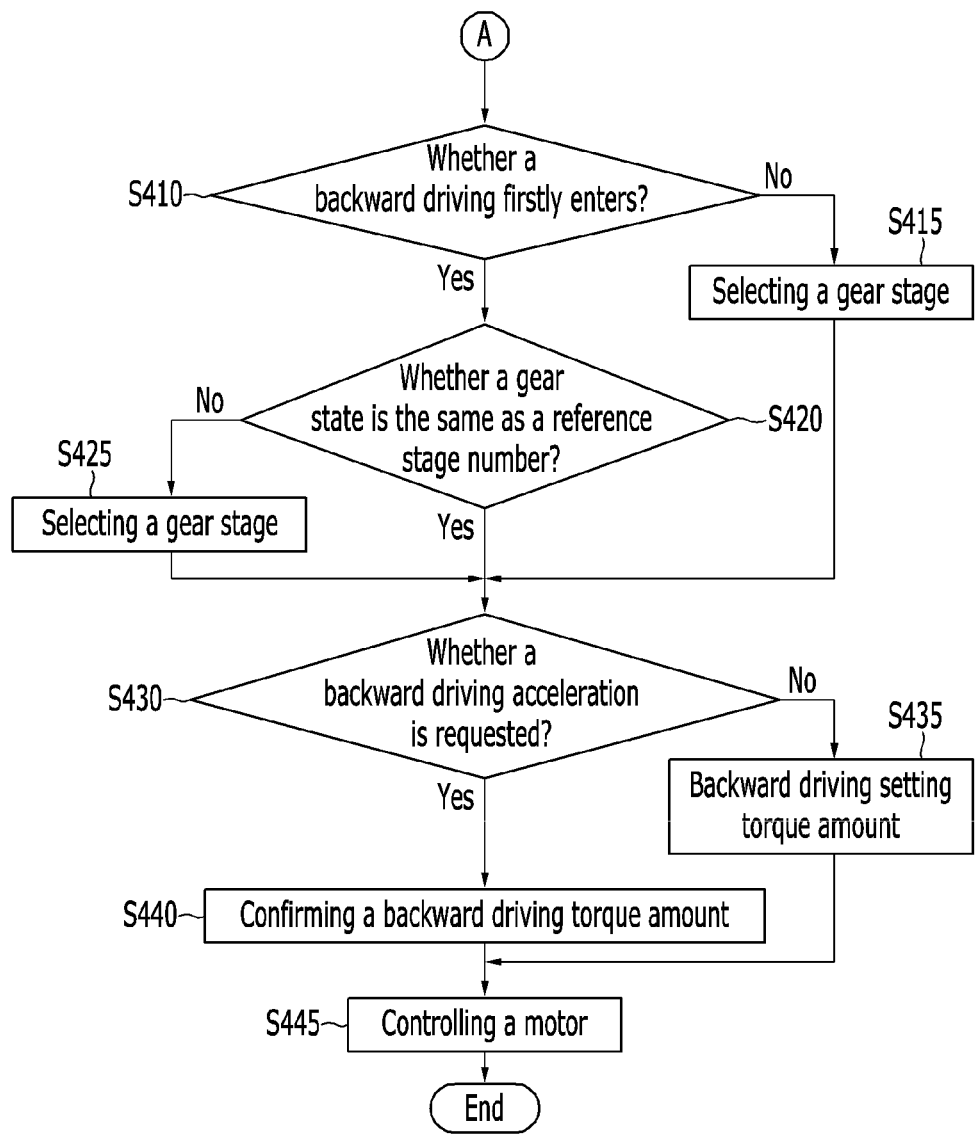

FIG. 3 and FIG. 4 are flowcharts showing a method controlling a shift in a hybrid vehicle according to one form of the present disclosure.

The vehicle controller 200 whether the backward moving request signal is input from the driver (S310).

On the other hand, if the backward moving request signal is not input from the driver, the vehicle controller 200 monitors whether the backward moving request signal is input.

If the backward moving request signal is input from the driver, the vehicle controller 200 releases the engine clutch 120 (S315). The reason releasing the engine clutch 120 is to reduce driving resistance in the EV driving and to prevent the power delivery of the engine 110 when the charge situation of the battery 160 is generated.

The vehicle controller 200 determines whether the vehicle speed is less than the reference speed (S320). That is, the vehicle controller 200 determines the progressing direction of the vehicle and whether the vehicle speed is less than the reference speed.

Meanwhile, in case that the vehicle speed is less than the reference speed will be described in the following step S410.

If the vehicle speed is the reference speed or more, the vehicle controller 200 selects the gear stage to slow down the speed of the vehicle (S325). In other words, the vehicle controller 200 selects the gear stage before entering the R stage. That is, the vehicle controller 200 may use the gear (e.g., a first stage or a second stage) that was engaged before entering the R stage as it is without the release when baking the vehicle.

The vehicle controller 200 selects the gear stage by the shift map predetermined by the relation of the vehicle speed and the load and then may perform the shift depending on the speed of the vehicle.

Also, the vehicle controller 200 3 may also select the gear stage depending on the braking only shift map for the regeneration energy efficiency to be driven in a best driving point in the braking of the first motor 130.

The vehicle controller 200 whether a calculation speed calculated based on the motor speed and the transmission main shaft speed is a predetermined speed or more (S330). In other words, the vehicle controller 200 generates the calculation speed by subtracting the transmission main shaft speed from the motor speed and determines whether the calculation speed is the predetermined speed.

If the calculation speed is the predetermined speed or more, the vehicle controller 200 performs the slip control of the transmission clutch or the motor speed control to engage the transmission clutch (S335 and S340). That is, if the calculation speed is the predetermined speed or more, the vehicle controller 200 may perform the slip engagement control while slowly engaging the transmission clutch. Therefore, the engagement impact of the transmission clutch may be smooth.

Also, the vehicle controller 200 synchronizes the first motor 130 with the transmission input shaft speed before engaging the transmission clutch, and then engages the transmission clutch. When engaging the clutch by this way, the vehicle drivability may be improved.

Meanwhile, if the calculation speed is the predetermined speed or less, the vehicle controller 200 engages the transmission clutch.

The vehicle controller 200 confirms the deceleration request of the driver based on the situation information (S345). In this case, the situation information may include the position value of the accelerator pedal, the position value of the brake pedal, etc.

If the deceleration request of the driver is confirmed based on the situation information, the vehicle controller 200 confirms the braking torque amount (S350). In other words, the deceleration request of the driver is confirmed based on the position value of the accelerator pedal and the position value of the brake pedal, the vehicle controller 200 may confirm the braking torque amount depend on the situation information based on the predetermined braking torque map.

If the deceleration request of the driver is not generated, the vehicle controller 200 confirms a braking setting torque amount that is predetermined (S355). In this case, the braking setting torque amount may represent the torque amount driving the first motor 130 to brake the vehicle.

When the braking torque amount or the braking setting torque amount is confirmed, the vehicle controller 200 controls the first motor 130 based on the confirmed torque amount (S360).

After that, the vehicle controller 200 returns the process to the step S320, and compares the vehicle speed with the reference speed.

When the vehicle speed is less than the reference speed at the step S320, the vehicle controller 200 determines first whether the vehicle enters into the backward moving (S410).

If the vehicle does not enter into the backward moving, the vehicle controller 200 selects the gear stage through the shift pattern map (S415). That is, the vehicle controller 200 may select the gear stage based on the shift pattern map for a driving energy of the motor efficiency to be driven in a best driving point.

If the vehicle enters into the backward moving, the vehicle controller 200 confirms the gear stage engaged to the transmission 150 and determines whether the gear stage engaged to the transmission 150 is the reference stage number (S420). In this case, the reference stage number may represent the gear stage to execute the backward moving. The reference stage number may be a low gear, for example, a "1" stage.

If the gear stage engaged to the transmission 150 is not the reference stage number, the vehicle controller 200 selects the gear stage as the reference stage number (S425). Next, the vehicle controller 200 shifts the gear stage engage to the transmission 150 into the reference stage number.

The vehicle controller 200 determines the backward moving acceleration request of the driver based on the situation information (S430). That is, the vehicle controller 200 determines whether the driver wants to be accelerated in the backward moving direction based on accelerator pedal position value of the situation information, the brake pedal position value.

If the driver does not want the backward moving acceleration request, the vehicle controller 200 confirms the backward moving setting torque amount that is predetermined (S435). In this case, the backward moving setting torque amount may represent the torque amount of the first motor 130 for the backward moving of the vehicle when the driver does not request the acceleration for the backward moving.

If the backward moving acceleration request of the driver based on the situation information is confirmed, the vehicle controller 200 confirms the backward moving torque amount (S440). In detail, the driver requests the backward moving acceleration, the vehicle controller 200 confirms the forward driving torque amount depending on the situation information through the forward driving torque map. The vehicle controller 200 converts the forward driving torque amount into a negative number to set as the backward moving torque amount.

Also, the driver requests the backward moving acceleration, and the vehicle controller 200 confirms the backward moving torque amount depending on the situation information through the torque map for the backward moving.

The vehicle controller 200 controls the first motor 130 based on the backward moving torque amount confirmed in the step S440 to move the vehicle (S445) backward.

Figure 5:
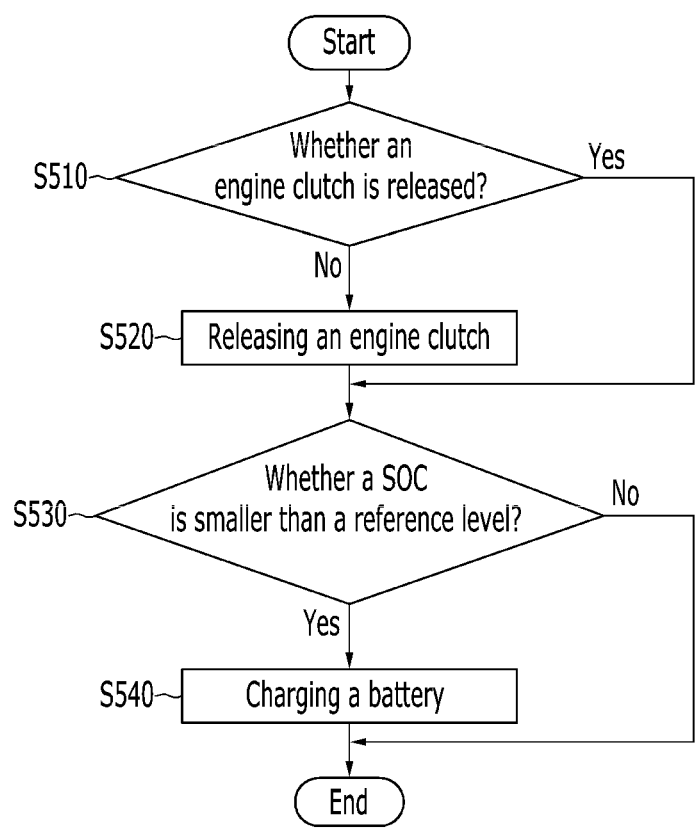
FIG. 5 is a flowchart showing method controlling a charge in a hybrid vehicle according to one form of the present disclosure.

FIG. 5 is a flowchart showing method controlling a charge in a hybrid vehicle according to one form of the present disclosure.

The vehicle controller 200 determined whether the engine clutch 120 is released (S510).

If the engine clutch 120 is not released, the vehicle controller 200 releases the engine clutch 120 positioned between the engine 110 and the first motor 130 (S520).

The vehicle controller 200 determines whether the SOC of the battery 160 is the reference level or less in the stage that the engine clutch 120 is released (S530).

If the SOC of the battery 160 is the reference level or less, the vehicle controller 200 charges the battery 160 (S540). In other words, if the SOC of the battery 160 is the reference level or less, the vehicle controller 200 requests the starting to the engine 110, if the starting is completed, the vehicle controller 200 controls the engine 110 to generate the output for the charge of the battery 160 and charges the battery 160 till the SOC of the battery 160 reaches a target SOC through the second motor 140.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A shift control apparatus for a hybrid vehicle comprising:
an engine as a power source;
first and second motors connected to the engine;
an engine clutch positioned between the engine and the first motor and selectively connecting the engine and the first motor;
a transmission receiving a driving torque from at least one of the engine and first motor by a release or an engagement of the engine clutch; and
a vehicle controller releasing the engine clutch if a backward moving request signal is input, confirming a backward moving torque amount when a speed of the vehicle is at a reference speed or less, and controlling the first motor based on the backward moving torque amount for the vehicle to be moved backward,
wherein the vehicle controller includes:
an engine clutch control unit releasing the engine clutch if the backward moving request signal is input; and
a motor driver determining whether the speed of the vehicle is a reference speed or less and confirming the backward moving torque amount if the speed of the vehicle is the reference speed or less,
wherein the motor driver includes:
a determining unit determining whether the speed of the vehicle is the reference speed or less;
a braking executing unit setting a braking torque amount to brake the vehicle through the first and second motors if the speed of the vehicle exceeds the reference speed; and
a backward moving executing unit confirming the backward moving torque amount for the backward moving of the vehicle if the speed of the vehicle is the reference speed or less.

2. The shift control apparatus of claim 1, wherein the braking executing unit includes:
a braking gear stage selecting unit selecting a gear stage based on the gear stage before entering a "R" stage to brake the vehicle or a predetermined shift map;
a transmission clutch control unit engaging the transmission clutch after synchronizing a motor speed based on the motor speed of the first motor and a main shaft speed of the transmission with the input shaft speed of the transmission, or engaging the transmission clutch with a predetermined speed; and
a braking torque confirming unit confirming the braking torque amount depending on situation information if a deceleration request of the driver is confirmed based on the situation information.

3. The shift control apparatus of claim 1, wherein the backward moving executing unit includes:
a backward moving gear stage control unit confirming a gear stage engaged to the transmission and shifting downward the gear stage engaged to the transmission to a reference stage number when the confirmed gear stage is not the reference stage number; and a backward moving torque confirming unit confirming the backward moving torque amount through a forward driving torque map or a backward moving torque map if a backward moving acceleration request of the driver is confirmed based on the situation information.

4. The shift control apparatus of claim 1, further comprising:
a battery providing a driving voltage to the first and second motors, wherein the vehicle controller requests a starting to the engine when a SOC (State Of Charge) of the battery is a reference level or less, in a state that the engine is starting, a charge control unit charging the battery through the second motor is further included.

5. A shift control apparatus for a hybrid vehicle comprising:
an engine, a first and second motors as a power source;
a battery providing a driving voltage to the first and second motors;
a engine clutch positioned between the engine and the first motor and selectively connecting the engine and the first motor;
a transmission receiving a driving torque from at least one of the engine and the first motor by a release or an engagement of the engine clutch; and
a vehicle controller for realizing a driving mode by controlling the release or the engagement of the engine clutch,
wherein the vehicle controller includes:
an engine clutch release unit releasing the engine clutch if a backward moving request signal is input;
a motor driver determining whether a speed of the vehicle is a reference speed or less and confirming a backward moving torque amount if the speed of the vehicle is the reference speed or less; and
a charge control unit charging the battery by using the second motor when a SOC (State Of Charge) of the battery is a reference level or less,
wherein the motor driver includes:
a determining unit determining whether the speed of the vehicle is the reference speed or less;
a braking executing unit confirming a braking torque amount to brake the vehicle by using at least one of the first and second motors if the speed of the vehicle exceeds the reference speed; and
a backward moving executing unit confirming a backward moving torque amount for the backward moving of the vehicle if the speed of the vehicle is the reference speed or less.

6. The shift control apparatus of claim 5, wherein the braking executing unit includes:
a braking gear stage selecting unit selecting a gear stage based on the gear stage before entering a "R" stage to brake the vehicle or a predetermined shift map;
a transmission clutch control unit engaging the transmission clutch after synchronizing a motor speed based on the motor speed of the first motor and a main shaft speed of the transmission with the input shaft speed of the transmission, or engaging the transmission clutch with a predetermined speed; and
a braking torque confirming unit confirming a braking torque amount depending on situation information through a predetermined braking torque map if a deceleration request of the driver is conformed based on the situation information.

7. The shift control apparatus of claim 5, wherein the backward moving executing unit includes:

a backward moving gear stage control unit confirming the gear stage engaged to the transmission and shifting downward the gear stage engaged to the transmission to a reference stage number when the confirmed gear stage is not the reference stage number; and
a backward moving torque confirming unit confirming the backward moving torque amount through a forward driving torque map or a backward moving torque map if the backward moving acceleration request of the driver is confirmed based on the situation information.

8. The shift control apparatus of claim 7, wherein the backward moving torque confirming unit confirms the forward driving torque amount through the forward driving torque map based on the situation information and converting the forward driving torque amount into a negative number to set the backward moving torque amount.

9. A shift control method for a hybrid vehicle comprising:
releasing an engine clutch if a backward moving request signal is input;
determining whether a speed of a vehicle is a reference speed or less;
confirming a gear stage engaged to a transmission if the speed of the vehicle is the reference speed or less and whether the confirmed gear stage is a reference stage number;
whether there is a backward moving acceleration request of a driver based on situation information if the gear stage engaged to the transmission is the reference stage number;
confirming a backward moving torque amount depending on the situation information if there is the backward moving acceleration request of the driver; and
controlling a motor based on the backward moving torque amount for backward moving the vehicle.

10. The shift control method of claim 9, further comprising:
after confirming whether the gear stage is the reference stage number,
shifting downward the gear stage engaged to the transmission into the reference stage number if the gear stage is not the reference stage number.

11. The shift control method of claim 9, further comprising:
after determining whether the speed of the vehicle is the reference speed or less,
selecting the gear stage based on the gear stage before entering a "R" stage or a predetermined shift map of the speed of the vehicle exceeds the reference speed;
engaging a transmission clutch or engaging the transmission clutch to a predetermined speed after synchronizing the motor speed to an input shaft speed of the transmission based on the speed of the motor and a main shaft speed of the transmission;
confirming whether there is a deceleration request of the driver based on situation information; and
confirming a braking torque amount depending on the situation information through a predetermined braking torque map to control the motor if there is the deceleration request of the driver.

12. The shift control method of claim 11, further comprising:
after confirming whether there is the deceleration request of the driver,
controlling the motor based on a braking setting torque amount if there is no the deceleration request of the driver.

13. The shift control method of claim 9, wherein the confirming of the backward moving torque amount is confirming the backward moving torque amount through one of a forward driving torque map or a backward moving torque map if there is the backward moving acceleration request of the driver.

14. The shift control method of claim 9, further comprising:
- after determining whether there is the backward moving acceleration request of the driver based on the situation information,
- controlling the motor of the vehicle for backward moving the vehicle based on a predetermined backward moving setting torque amount if there is no the backward moving acceleration request of the driver.

15. The shift control method of claim 9, further comprising:
- after releasing the engine clutch,
- determining whether a SOC of the battery is a reference level or less; and requesting a starting to the engine if the SOC of the battery is the reference level or less and charging the battery through the motor in a state that an engine is starting.

\* \* \* \* \*